United States Patent
Kaiser et al.

(10) Patent No.: US 6,789,415 B1
(45) Date of Patent: Sep. 14, 2004

(54) BRAKE DEVICE FOR VEHICLE BRAKE SYSTEMS

(75) Inventors: Harry Kaiser, Markgroeningen (DE); Sven Doering, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/959,148

(22) PCT Filed: Apr. 21, 2000

(86) PCT No.: PCT/DE00/01233
§ 371 (c)(1),
(2), (4) Date: Nov. 21, 2001

(87) PCT Pub. No.: WO00/63665
PCT Pub. Date: Oct. 26, 2000

(30) Foreign Application Priority Data

Apr. 21, 1999 (DE) ...................... 199 17 941.7

(51) Int. Cl.[7] .............................. G01L 5/28
(52) U.S. Cl. .......................... 73/121; 73/129
(58) Field of Search ................ 73/39, 40, 46, 73/49.7, 121, 129

(56) References Cited

U.S. PATENT DOCUMENTS

| | | | |
|---|---|---|---|
| 4,536,820 A | | 8/1985 | Binder et al. |
| 4,771,387 A | * | 9/1988 | Hexel et al. ................... 701/76 |
| 5,357,800 A | * | 10/1994 | Reuter et al. .................. 73/121 |
| 5,373,454 A | * | 12/1994 | Kanda et al. ............... 700/282 |
| 5,631,632 A | * | 5/1997 | Nakashima et al. ........ 340/611 |

FOREIGN PATENT DOCUMENTS

| | | |
|---|---|---|
| DE | 43 42 665 A | 6/1995 |
| DE | 197 11 366 A | 9/1998 |

* cited by examiner

*Primary Examiner*—Edward Lefkowitz
*Assistant Examiner*—Jermaine Jenkins
(74) *Attorney, Agent, or Firm*—Ronald E. Greigg

(57) ABSTRACT

In a brake device for vehicle brake systems, having at least one pressure sensor for measuring the brake pressure and having an electronic control unit for evaluating measured values and generating control signals, for the sake of simplified fully automatic assembly of the brake device, the electronic control unit is accommodated in a housing fitted over the at least one pressure sensor and establishes the electrical connection between the pressure sensor and the electronic control unit by means of spring contact pins, which are braced with spring force on their face ends on opposed contact faces associated with the pressure sensor and the electronic control unit.

20 Claims, 3 Drawing Sheets

BRAKE DEVICE FOR VEHICLE BRAKE SYSTEMS

CROSS-REFERENCE TO RELATED APPLICATIONS

This application is a 35 USC 371 application of PCT/DE 00/01233 filed on Apr. 21, 2000.

BACKGROUND OF THE INVENTION

1. Field of the Invention

The invention is directed to an improved brake device for vehicle brake systems and more particularly to an improved brake device used in electrohydraulic anti-lock brake system.

2. Description of the Prior Art

Brake devices of the type with which this invention is concerned are used in electrohydraulic anti-lock brake systems or brake systems without mechanical coupling between the brake actuating pedal and the master cylinder. The primary parameters for regulating these electrical brake systems are the operating pressures occurring in the brake circuits, which are detected by pressure sensors of the brake device and converted into electrical measured values. The electronic control unit evaluates the measured values together with other sensor signals and generates appropriate trigger signals for the brake assembly.

In a known brake device of this type (German Patent Disclosure DE 197 11 366 A1), a plurality of pressure sensors are connected via a circuit substrate to a plug assembly secured to a printed circuit board. The electrical connection with the electronic control unit is established via a plug, connected to a connecting cable that leads to the electronic control unit, and this plug has to be plugged onto the plug assembly.

In another known pressure conducting device (U.S. Pat. No. 4,536,820) of the type defined at the outset, a pressure sensor for pressure measurement and an electronic control unit disposed with spacing from it are provided and have opposed contact faces. An electrical connection between the pressure sensor and the electronic control unit is established by means of spring contact pins. To this end, sleeves of the spring contact pins reach through a spacer body disposed between the pressure sensor and the electronic control unit. The sleeves are connected to the spacer body in pressure-tight, electrically insulated, and displaceable fashion. While the spring contact pins are braced with spring force on the face on the contact faces of the pressure sensor, spring contacts disposed on the contact faces of the electronic control unit engage the sleeves of the spring contact pins. The pressure sensor, the spacer body with the spring contact pins and the electronic control unit are housed in a housing fitted over them and the housing is secured to the pressure-conducting device.

The assembly of these components is relatively complicated: First, the pressure sensor must be connected in pressure-tight, nondisplaceable fashion to the pressure-conducting device. Then the spacer body, with the sleeves of the spring contact pins secured in it, must be mounted on the pressure-conducting device. Then the housing is joined to the pressure-conducting device. Finally, the electronic control unit has to be installed in the housing. Automatic assembly of the pressure-conducting device is therefore possible only with difficulty.

SUMMARY OF THE INVENTION

The brake device according to the invention has the advantage that fully automatic assembly of the brake device is possible, in which once the housing containing the electronic control unit has been fitted over the at least one pressure sensor, the electrical connection is established automatically between the pressure sensor and the electronic control unit. The housing is secured to a hydraulic block of the brake device, in which the at least one pressure sensor is also inserted, so that the spring contact pins are braced with a defined contact pressure on the contact faces of the pressure sensor and the electronic control unit and assure secure transmission of signals and data.

In an advantageous embodiment of the invention, the spring contact pins have a sleeve with a helical compression spring located inside it and have at least one pin, which is axially displaceable in the sleeve and is urged by the helical compression spring in the expulsion direction out of the sleeve. The spring contact pins can be embodied in various ways. In a simple version, the contact pin on the one hand, and the entirely or partly closed one end of the sleeve on the other form the contact parts that contact the contact faces of the pressure sensor and the electronic control unit. The compression spring is braced between the pin and the end of the sleeve. In another embodiment, two pins are provided, with each protrude from the sleeve at one end thereof. The helical compression spring received in the sleeve is braced between the two pins and presses one pin against a contact face of the electronic control unit. In all cases, a stop is formed on each pin and cooperates with a respective counterpart stop in the sleeve, so that the pin, in the absence of counterpressure before the final assembly, cannot be expelled from the sleeve.

In a preferred embodiment of the invention, the pressure sensor has a cup-shaped measurement cell and a flange receiving the measurement cell, which flange protrudes with a central protrusion into the measurement cell and with a central peg into a bore embodied in a hydraulic block, and which flange is provided with a central through bore that penetrates the protrusion and the peg. By means of the protrusion protruding into the measurement cell, the hollow space in the measurement cell is reduced to the minimum required, which assures that relatively large proportions of residual air cannot become separated in the measurement gap and adulterate the pressure measurement. The flange, as a simple turned part, is easy to make and assures the connection of the measurement cell with the interior of the hydraulic block; in a further embodiment of the invention, after the placement of a seal the flange is calked in the hydraulic block, after the placement of a seal in a plunge cut embodied on the peg. The cup-shaped measurement cell, on its cup edge resting on the flange, is welded to the flange. Both the calking and the welding can be done simply and economically in an automated process.

The electrical connection of the pressure sensor to the contact faces toward the sensor that are acted upon by the spring contact pins is done, in accordance with advantageous embodiments of the invention, via gold bonding wires to a spray-coated stamped grid surrounding the pressure sensor, on which grid a printed circuit board which in turn carries the contact faces is disposed. The printed circuit board is soldered to the stamped grid, and the stamped grid is provided with ground contact by means of at least one forklike flat plug, embodied integrally on the stamped grid, that protrudes into an annular groove machined coaxially into the flange, and there the plug makes electrical contact for the flanks and/or the bottom of the groove. The spray-coated stamped grid is received on the face end in the annular groove and is fixed to the flange by wedging in of one edge of the groove.

In an advantageous embodiment of the invention, the electronic control unit has an electronics box, which is disposed on the face end of the housing remote from the pressure sensor, and it also has a stamped grid, held in front of it in the housing; this stamped grid, on its underside remote from the electronics box, carries the contact faces that are assigned to the control unit.

BRIEF DESCRIPTION OF THE DRAWINGS

The invention is explained in further detail in the ensuing description in terms of an exemplary embodiment, with reference to the drawings, in which.

DESCRIPTION OF THE PREFERRED EMBODIMENTS

Figure 3:
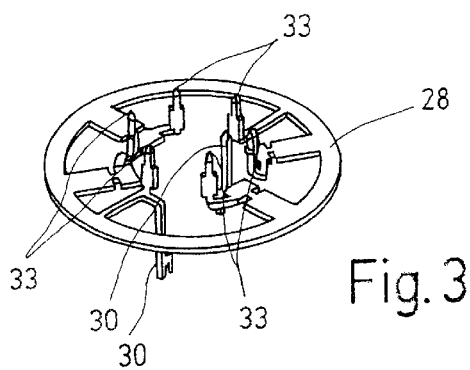
FIG. 3, a perspective view of a stamped grid of the component subassembly of FIG. 2.
Figure 4:
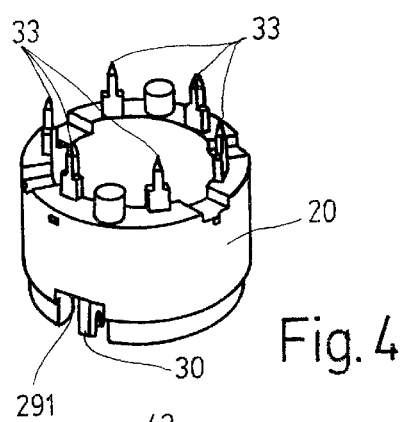
FIG. 4, a perspective view of the spray-coated stamped grid of FIG. 3.
Figure 5:
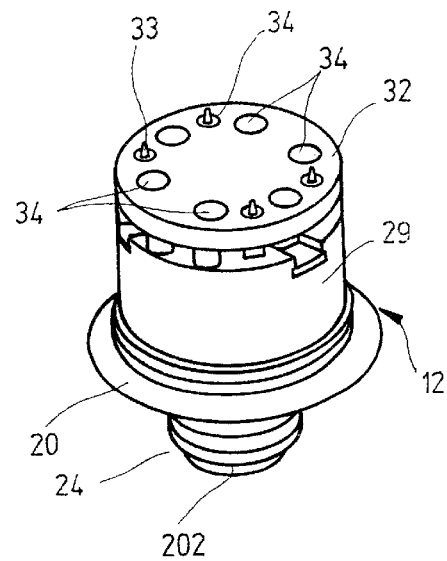
FIG. 5, a perspective view of the pressure sensor with the spray-coated stamped grid and a printed circuit board in the component subassembly of FIG. 2.

On the face end of the stamped grid 28 remote from the flange 20, an assembled printed circuit board 32 is placed (FIGS. 2 and 5) and connected electrically and mechanically to the stamped grid 28. To that end, the stamped grid 28 is provided with upward-protruding receiving mandrels 33 (FIGS. 3 and 4), which are inserted through openings 34 in the printed circuit board 32 and soldered in the openings 34. The resultant structural unit comprising the flange 20, measurement cell 19, stamped grid 28 with spray-coating 29, and printed circuit board 32 is shown in perspective in FIGS. 2 and 5. A total of four contact faces 35 for the electrical connection with the electronic control unit 13 are applied to the top side of the printed circuit board 32, remote from the spray-coated stamped grid 28, 29.

Figure 1:
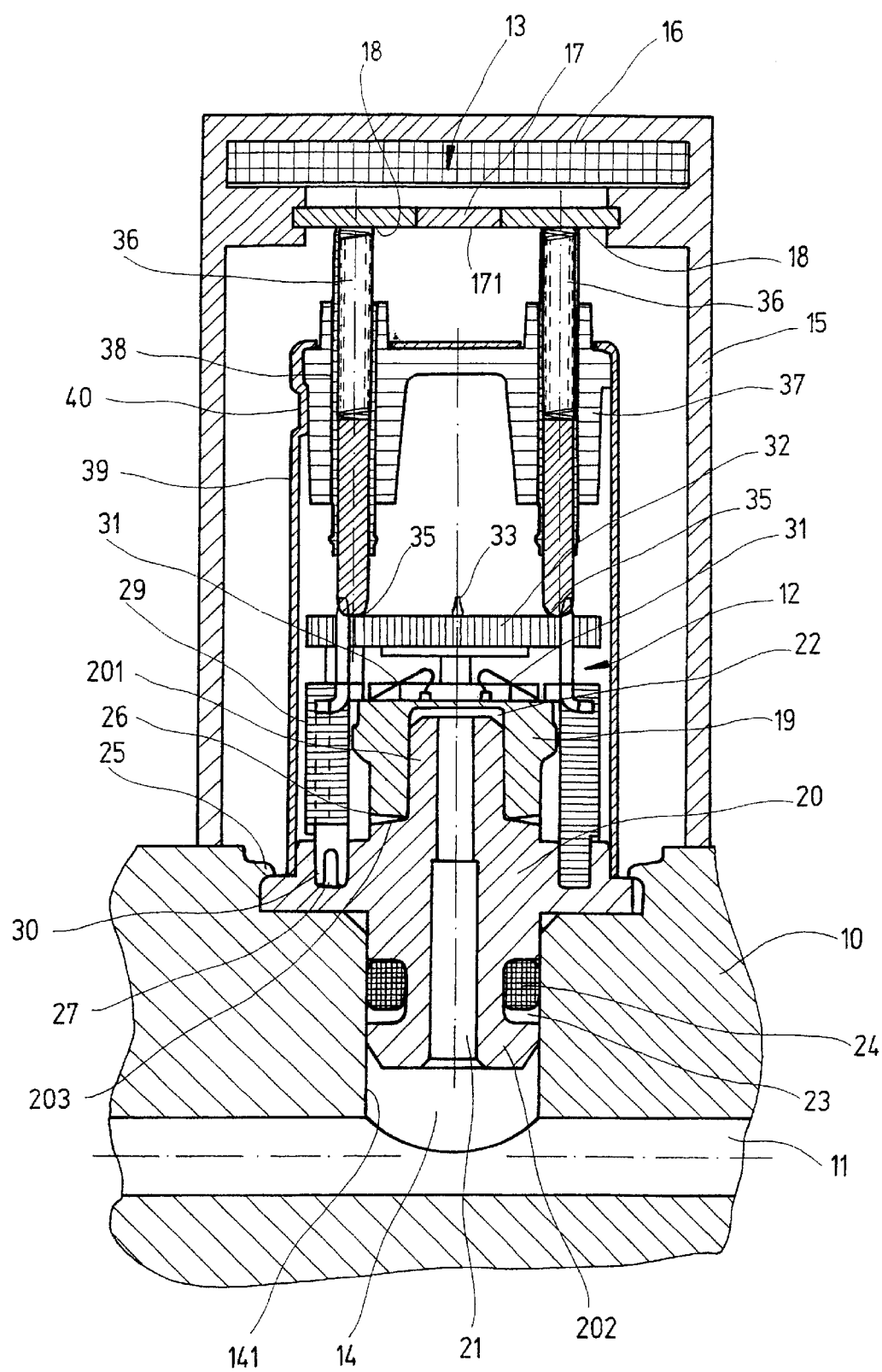
FIG. 1, a longitudinal section through a brake device for a vehicle brake system.

The electrical connection between the pressure sensor 12 and the electronic control unit 13 is established by a total of four spring contact pins 36 (FIGS. 1 and 2), which are inserted into guides 38 embodied in an insulator part 37. The insulator part 37 is received in a capsule 39, which coaxially surrounds the pressure sensor 12, including the spray-coated stamped grid 28, 29 and the printed circuit board 32, and is secured to the flange 20 by several spot welds. The pressure sensor 12 with the capsule 39 and the spring contact pins 36 protruding from the capsule 39 form a completely preassembled component subassembly of the brake device, of the kind shown in perspective in FIG. 2.

Figure 6:
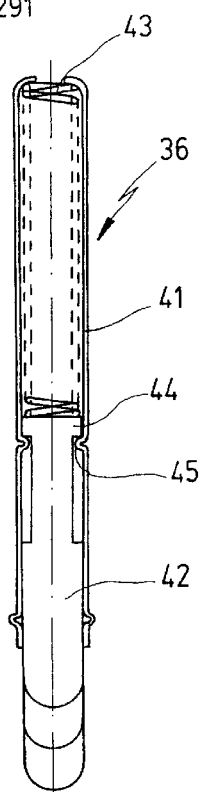
FIGS. 6–8, each show a longitudinal section of a different contact spring pin in accordance with further exemplary embodiments.

Each spring contact pin 36 comprises a sleeve 41, a contact pin 42 that is axially displaceable in the sleeve 41, and a helical compression spring 43 resting in the sleeve 43, which is braced by one spring end on the contact pin 42. In the embodiment of FIG. 6, spring 43 is braced by its other end on the entirely or partly closed end of the sleeve 41. As can be seen from the enlarged view in FIG. 6, a stop 44 is embodied on the contact pin 42; to limit the displacement path of the contact pin 42, this stop cooperates with a counterpart stop 45 in the sleeve 41 and thus prevents the contact pin 42 from slipping out of the sleeve 41 when no external load is applied to the contact pin.

Figure 2:
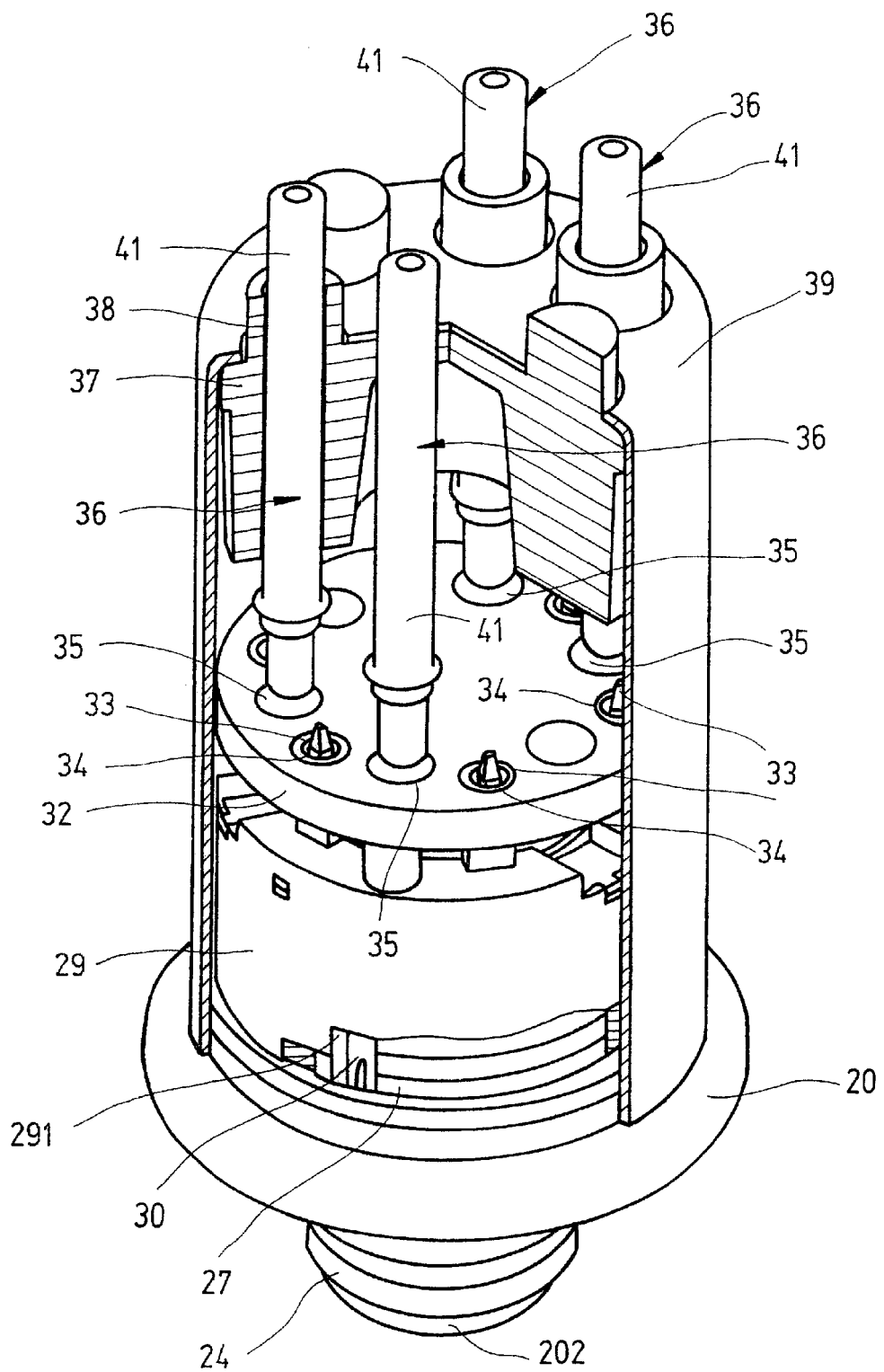
FIG. 2, a perspective view of a preassembled component subassembly of the brake device with a pressure sensor and spring contact pins, partly in section.

For assembly of the brake device, the preassembled component subassembly of FIG. 2 is inserted into the bore 14 in the hydraulic block 10 and calked to the flange 20 in the hydraulic block 10. After that, the housing 15, equipped with the electronics box 16 and the stamped grid 17, is slipped over the component subassembly of FIG. 2; the contact faces 18 embodied on the stamped grid 17 then rest on the face ends of the sleeves 41 of the spring contact pins 36. By compression of the helical compression springs 43 in the four spring contact pins 36, the housing 15 is now slipped over the component subassembly of FIG. 2 far enough that the cup edge of the housing 15 meets the hydraulic block 10. The housing 15 is now secured to the hydraulic block 10, which—as will not be shown in further detail—can be done by screwing, welding, calking or the like. Upon the final assembly of the brake device, with the fitting of the housing 15 over the component subassembly comprising the pressure sensor 12 and capsule 39 with spring contact pins 36, the electrical contacting between the pressure sensor 12 and the electronic control unit 13 is automatically established, without requiring any special plug-in operations.

Figure 7:
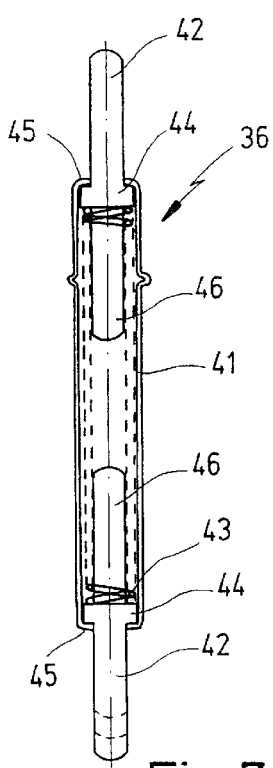
Figure 8:
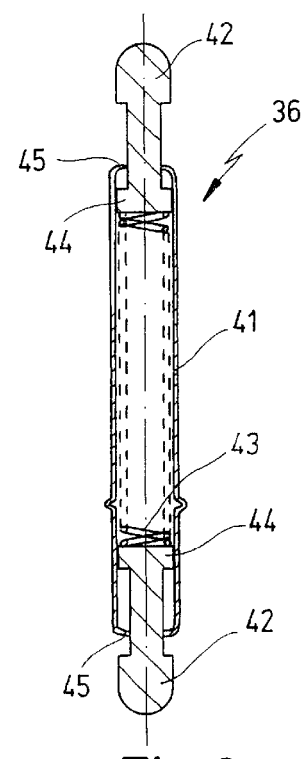

In FIGS. 7 and 8, two different exemplary embodiments for the embodiment of the spring contact pins 36 are also shown. In both exemplary embodiments, the spring contact pin 36 has two contact pins 42, which are guided displaceably in the sleeve 41 and protrude one from each end of the sleeve. The helical compression spring 43 is braced between the two contact pins 42. On each contact pin 42, a stop 44 is also formed, which cooperates with a counterpart stop 45 in the sleeve 41. In the exemplary embodiment of FIG. 7, each contact pin 42 has a guide mandrel 46, with the helical compression spring 43 fitted over it. In the exemplary embodiment of FIG. 8, a guide mandrel 46 of this kind is dispensed with, and the helical compression spring is guided in the sleeve 41.

The invention is not limited to the exemplary embodiment described. For instance, a plurality of pressure sensors 12 can be disposed side by side in the hydraulic block, and each pressure sensor 12 then detects the pressure in one of parallel hydraulic conduits 11 embodied in the hydraulic block 10. Each pressure sensor is combined, together with the spray-coated stamped grid 28, 29, the printed circuit board 32 and the insulator part 37 with spring contact pins 36, by means of the capsule 39 to make the preassembled component subassembly of FIG. 2. Once the various component subassemblies have been inserted into the corresponding bores 14 in the hydraulic block 10, a common housing 15 that contains the electronic control unit 13 and a number of stamped grids 17 with corresponding contact faces 18 to match the number of pressure sensors 12 is fitted over all the component subassemblies and secured to the hydraulic block 10. The stamped grids can also be combined into one single stamped grid.

The foregoing relates to preferred exemplary embodiment of the invention, it being understood that other variants and embodiments thereof are possible within the spirit and scope of the invention, the latter being defined by the appended claims.

What is claimed is:

1. A brake device for vehicle brake systems, said brake device comprising at least one pressure sensor (12) for measuring the brake pressure, an electronic control unit (13) for evaluating measured brake pressure values and generating control signals, said control unit being accommodated in a housing (10) fitted over said at least one pressure sensor, and spring contact pins establishing electrical connection between said pressure sensor (12) and said electronic control unit (13), said spring contact pins being braced with spring force on their face ends on opposed contact faces (35, 18) associated with the pressure sensor (12) and the electronic control unit (13), said the spring contact pins (36) being inserted into guides (38) embodied in an insulator part (37), said insulator part (37) being fixed, preferably by calking, in a capsule (39) which coaxially surrounds the pressure sensor (12) and in turn is secured to the pressure sensor (12).

2. The brake device of claim 1, wherein said spring contact pins (36) have a sleeve (41) with a helical compression spring (43) located inside it and have at least one pin (42), which is axially displaceable in the sleeve (41) and is urged by the helical compression spring (43) in the expulsion direction out of the sleeve (41).

3. The brake device of claim 2, further comprising a stop (44) disposed on said at least one pin (42) and cooperating with a counterpart stop (45) embodied in the sleeve (41) to limit the displacement path of the at least one pin (42).

4. The brake device of claim 3, wherein said pressure sensor (12) comprises a cup-shaped measurement cell (19) and a flange (20) receiving the measurement cell (19), which flange protrudes with a central protrusion (201) into the measurement cell (19) and with a central peg (202) into a bore (14) embodied in a hydraulic block (10), said flange being provided with a central through bore (21) that penetrates the protrusion (201) and the peg (202).

5. The brake device of claim 4, wherein said central peg (202) has a plunge cut (23), in which a sealing ring (24) pressing against the bore wall (141) of the bore (14) rests, and wherein the flange (20) is secured, preferably calked, to the hydraulic block (10).

6. The brake device of claim 5, further comprising an annular groove (27) coaxial with the peg (202), the protrusion (201) being embodied in the flange (20), and a spray-coated stamped grid (28, 29) coaxially surrounding the measurement cell (19) inserted into said groove.

7. The brake device of claim 1, wherein said pressure sensor (12) comprises a cup-shaped measurement cell (19) and a flange (20) receiving the measurement cell (19), which flange protrudes with a central protrusion (201) into the measurement cell (19) and with a central peg (202) into a bore (14) embodied in a hydraulic block (10), said flange being provided with a central through bore (21) that penetrates the protrusion (201) and the peg (202).

8. The brake device of claim 7, wherein said central peg (202) has a plunge cut (23), in which a sealing ring (24) pressing against the bore wall (141) of the bore (14) rests, and wherein the flange (20) is secured, preferably calked, to the hydraulic block (10).

9. The brake device of claim 8, wherein said cup-shaped measurement cell (19), with its cup edge, rests on an annular shoulder (203) embodied on the flange (20) and is welded there.

10. The brake device of claim 8, further comprising an annular groove (27) coaxial with the peg (202), the protrusion (201) being embodied in the flange (20), and a spray-coated stamped grid (28, 29) coaxially surrounding the measurement cell (19) inserted into said groove.

11. The brake device of claim 10, wherein said spray-coated stamped grid (28, 29) is secured in said annular groove (27), for instance by wedging in of one edge of said groove.

12. The brake device of claim 11, further comprising at least one flat plug tongue (30) embodied on said stamped grid (28), said tongue protruding into said annular groove (27) and contacting the groove flanks and/or the groove bottom of said annular groove (27), to establish a ground contact with the stamped grid (28).

13. The brake device of claim 10, further comprising at least one flat plug tongue (30) embodied on said stamped grid (28), said tongue protruding into said annular groove (27) and contacting the groove flanks and/or the groove bottom of said annular groove (27), to establish a ground contact with the stamped grid (28).

14. The brake device of claim 13, wherein said measurement cell (19) is electrically conductively connected to the stamped grid (28) via gold bonding wires (31).

15. The brake device of claim 10, wherein said measurement cell (19) is electrically conductively connected to the stamped grid (28) via gold bonding wires (31).

16. The brake device of claim 10, further comprising an assembled printed circuit board (32) on the face end of said stamped grid remote from said flange (20) and connected electrically and mechanically to said stamped grid (28).

17. The brake device of claim 16, wherein said stamped grid (28) comprises upward-protruding receiving mandrels (33), which are inserted through openings (34) in said printed circuit board (32) and soldered in the openings (34).

18. The brake device of claim 16, wherein said contact faces (35), contacted by said spring contact pins (36) and located toward said pressure sensor, are disposed on the top side of said printed circuit board (32), facing away from said pressure sensor (12).

19. The brake device of claim 18, wherein said electronic control unit (13) is received in an electronics box (16), said electronic box being disposed on the face end of said housing (15) remote from said pressure sensor (12) and having a stamped grid (17) held in front of it in said housing (15), and wherein said contact faces (18) associated with said electronic control unit (13) are embodied on the underside (171) of said stamped grid (17), remote from the electronics box (16).

20. The brake device of claim 16, wherein said capsule (39) coaxially surrounds said printed circuit board (32) and spray-coated stamped grid (28, 29) and is secured by its face end to said flange (20), preferably by spot welding.

\* \* \* \* \*